US008448670B2

(12) United States Patent
Bentley

(10) Patent No.: US 8,448,670 B2
(45) Date of Patent: May 28, 2013

(54) BIO-PHARMACEUTICAL HOSE

(75) Inventor: Robert Bentley, Windsor, CT (US)

(73) Assignee: Swagelok Company, Solon, OH (US)

(*) Notice: Subject to any disclaimer, the term of this patent is extended or adjusted under 35 U.S.C. 154(b) by 73 days.

(21) Appl. No.: 13/237,063

(22) Filed: Sep. 20, 2011

(65) Prior Publication Data
US 2012/0006443 A1    Jan. 12, 2012

Related U.S. Application Data

(62) Division of application No. 11/503,868, filed on Aug. 14, 2006, now Pat. No. 8,048,351.

(51) Int. Cl.
*F16L 11/00* (2006.01)
*B29C 63/06* (2006.01)
*B29C 45/14* (2006.01)
*B29D 23/00* (2006.01)

(52) U.S. Cl.
USPC ........... 138/125; 138/127; 138/133; 138/137; 138/138; 428/36.91

(58) Field of Classification Search
None
See application file for complete search history.

(56) References Cited

U.S. PATENT DOCUMENTS

| | | | |
|---|---|---|---|
| 4,806,289 A | 2/1989 | Laursen et al. | |
| 5,062,456 A | 11/1991 | Cooke et al. | |
| 5,708,054 A | 1/1998 | Mine et al. | |
| 5,759,329 A | 6/1998 | Krause et al. | |
| 5,928,794 A | 7/1999 | Kalinowski et al. | |
| 6,004,310 A * | 12/1999 | Bardsley et al. | 604/524 |
| 6,194,476 B1 | 2/2001 | De Ridder et al. | |
| 6,299,952 B1 | 10/2001 | Honma et al. | |
| 6,613,185 B1 | 9/2003 | Valade et al. | |
| 6,742,545 B2 | 6/2004 | Fisher et al. | |
| 6,807,988 B2 | 10/2004 | Powell et al. | |
| 6,948,528 B2 | 9/2005 | Martucci et al. | |
| 7,119,159 B2 | 10/2006 | Fehn et al. | |
| 7,332,227 B2 | 2/2008 | Hardman et al. | |
| 2002/0134451 A1 | 9/2002 | Blasko et al. | |
| 2002/0144742 A1 | 10/2002 | Martucci et al. | |
| 2004/0142135 A1 | 7/2004 | Verschuere et al. | |
| 2004/0175526 A1 | 9/2004 | Corveleyn et al. | |
| 2006/0099368 A1 | 5/2006 | Park | |
| 2007/0181202 A1 | 8/2007 | Polasky | |
| 2009/0236004 A1 | 9/2009 | Jani et al. | |

OTHER PUBLICATIONS

Office action from U.S. Appl. No. 11/503,868 dated Mar. 10, 2010.
Response from U.S. Appl. No. 11/503,868 dated Jul. 9, 2010.

(Continued)

*Primary Examiner* — Jeffrey Wollschlager
(74) *Attorney, Agent, or Firm* — Calfee, Halter & Griswold LLP

(57) ABSTRACT

A hose for use in bio-pharmaceutical applications includes an innermost tubular layer made from a fluoropolymer material. The tubular layer has an inner, relatively smooth and pure surface that defines an opening for transfer of various media. A layer of silicone is disposed next to an outer surface of the innermost tubular layer through use of, for example, an extrusion method. The outer surface of the tubular layer may first be modified by various treatments or chemicals to facilitate the adhesion of the silicone layer thereto. The silicone material may be solid or foamed. A reinforcement layer may be disposed adjacent to an outer surface of the silicone layer. The reinforcement layer may be formed of a wire braid having gaps. An outer jacket of silicone may be attached to the reinforcement layer and to the inner silicone layer through the gaps in the reinforcement layer.

10 Claims, 5 Drawing Sheets

OTHER PUBLICATIONS

Office action from U.S. Appl. No. 11/503,868 dated Sep. 21, 2010.
Interview Summary from U.S. Appl. No. 11/503,868 dated Nov. 17, 2010.
Response from U.S. Appl. No. 11/503,868 dated Nov. 22, 2010.
Interview Summary from U.S. Appl. No. 11/503,868 dated Dec. 9, 2010.
Response from U.S. Appl. No. 11/503,868 dated Jan. 21, 2011.
Office action from U.S. Appl. No. 11/503,868 dated Feb. 16, 2011.
Response from U.S. Appl. No. 11/503,868 dated Jun. 16, 2011.
Interview Summary from U.S. Appl. No. 11/503,868 dated Jun. 20, 2011.
Notice of Allowance and Interview Summary from U.S. Appl. No. 11/503,868 dated Sep. 2, 2011.

* cited by examiner

BIO-PHARMACEUTICAL HOSE

This is a divisional application of U.S. Ser. No. 11/503,868, filed on Aug. 14, 2006, now U.S. Pat. No. 8,048,351.

BACKGROUND OF THE INVENTION

The invention relates in general to a hose and in particular to a hose for use in bio-pharmaceutical applications.

Pharmaceutical companies typically use hoses to transfer bio-pharmaceutical materials at various locations within the process of manufacturing pharmaceutical products. These bio-pharmaceutical materials may include laboratory and food products as well as various chemicals. A requirement for such hoses is for the inside surface of the innermost layer of the hose (i.e., the surface in contact with the bio-pharmaceutical materials) to be smooth throughout and of a high degree of purity, and thus free from becoming contaminated and/or breaking down (i.e., chemically inert) or degrading relatively quickly over time. Typically the innermost surface of such hoses is required to be sterilized and cleaned relatively frequently, for example, by passing pressurized superheated steam through the hose and/or by an autoclave process. However, such cleaning processes tend to degrade the innermost surface of some prior art hoses over time. Other typical requirements for bio-pharmaceutical hoses include, for example, resistance from permanent kinking, a relatively high degree of flexibility, sufficient hoop strength and tensile strength, relative ease of handling and attachment to mechanical couplings, and a relatively high degree of vacuum resistance (i.e., the resistance to being constricted when negative pressure or suction is applied to the hose).

Prior art hoses for use in the bio-pharmaceutical industry typically comprise a single layer of silicone material or a multi-layered hose having a silicone material for the innermost tubular member. While the silicone material tends to provide moderate levels of flexibility and kink resistance (and, thus, relative ease in handling), the innermost surface of the silicone material nevertheless tends to become contaminated and/or degraded relatively quickly over time, particularly by the repeated steam cleaning process. This results in the replacement of the silicone material hose more frequently than desired. Other prior art bio-pharmaceutical hoses have comprised a layer of a relatively heavy or thick wall of fluoropolymer material where the layer has a relatively smooth innermost surface and a convoluted or spiral-grooved outer surface. However, oftentimes the required smooth finish of the innermost surface of such a hose becomes undesirably compromised over time (e.g., rippled or otherwise deformed), particularly when the hose is flexed. Also, other smoothbore fluoropolymer hoses without a convoluted external outer surface typically lack flexibility and are relatively heavy and thus difficult to handle when the inner diameter of the hose exceeds one inch.

Still other prior art hoses achieve the required level of vacuum resistance through use of a reinforcement layer made of relatively heavy helix wire. However, such a metallic layer tends to be relatively stiff, thereby requiring a large amount of force to flex or bend the hose. Further, when bent, the innermost surface of such a hose tends to lose its smoothness at the point of bending. In other known hoses, the superheated steam vapor used during the steam cleaning process permeates or enters the matrix of the inner wall material. This tends to accelerate the breakdown of the innermost surface of the hose.

What is needed is a bio-pharmaceutical hose having a relatively long-lasting purity of the innermost surface through which the bio-pharmaceutical materials are transferred, while providing a relatively large amount of flexibility and resistance to kinking and steam permeation and also providing relatively high tensile and hoop strength and vacuum resistance, and also being easy to handle and readily attached to mechanical couplings.

SUMMARY OF THE INVENTION

According to an aspect of the invention, a hose for use in bio-pharmaceutical applications includes an innermost tubular layer that comprises, for example, a fluoropolymer material. The tubular layer has an inner, relatively smooth and pure surface that defines an opening for transfer of various media. The innermost tubular layer may be made electrically-conductive by the addition of, e.g., carbon material, within the fluoropolymer material. A layer of silicone is disposed next to an outer surface of the innermost tubular layer through use of, for example, an extrusion method. The outer surface of the tubular layer may first be modified by various treatments or chemicals to facilitate the adhesion of the silicone layer thereto. The silicone material comprising the layer may be solid or foamed, and its outer surface may be smooth or convoluted or corrugated.

According to a further aspect of the invention, a reinforcement layer may be disposed adjacent to an outer surface of the silicone layer. The reinforcement layer may comprise a yarn textile or wire braid having gaps or interstices. Next, an outer jacket layer of silicone may be attached to the reinforcement layer, again through use of an extrusion method. By utilizing a liquid silicone and subsequently curing the liquid silicone to a solid state, the liquid silicone can penetrate the gaps of the reinforcement layer and, upon curing, can adhere relatively strongly to the outer surface of the inner silicone layer.

According to yet another aspect of the invention, a plurality of hoses as described above may be arranged in a hose assembly where an outer layer of silicone encloses the plurality of hoses.

Another aspect of the invention involves a method for making a hose which includes the provision of an inner tubular member made from, e.g., a fluoropolymer material, having a smooth innermost surface. Next, a silicone layer is formed over an outer surface of the inner tubular member preferably by a cross-head extrusion process that utilizes liquid silicone in two separate forms, a first form of liquid silicone including a liquid platinum or peroxide catalyzer; and a second form of silicone comprising a base silicone material having an adhesion promoter. The two separate liquid silicone elements are extruded onto the outer surface of the inner tubular member through pumping and metering of the silicone elements in a certain ratio, and mixing together of the elements to form a liquid silicone mixture. The mixture is extruded onto the inner tubular member through use of a cross-head die, and then the silicone is cured thereby forming a composite tubular hose where the silicone is strongly bonded to the inner tubular member. The silicone may also be foamed or aerated to form voids in the resulting silicone layer. The silicone layer may alternatively have its outer surface convoluted or corrugated. Optional subsequent steps may include attaching a reinforcement layer comprising a wire braid to the outer surface of the inner silicone layer, where the wire braid has gaps or interstices formed therein. An outer jacket of silicone may be formed over the reinforcement layer. The outer jacket may be formed initially from liquid silicone using similar process steps to those described above for forming the inner silicone layer. The liquid silicone of the outer jacket penetrates the gaps in the reinforcement layer during extrusion of the silicone onto the reinforcement layer such that the liquid silicone bonds to the outer surface of the inner silicone layer. The liquid silicone comprising the outer jacket is subsequently cured to form the multi-layered hose end product.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
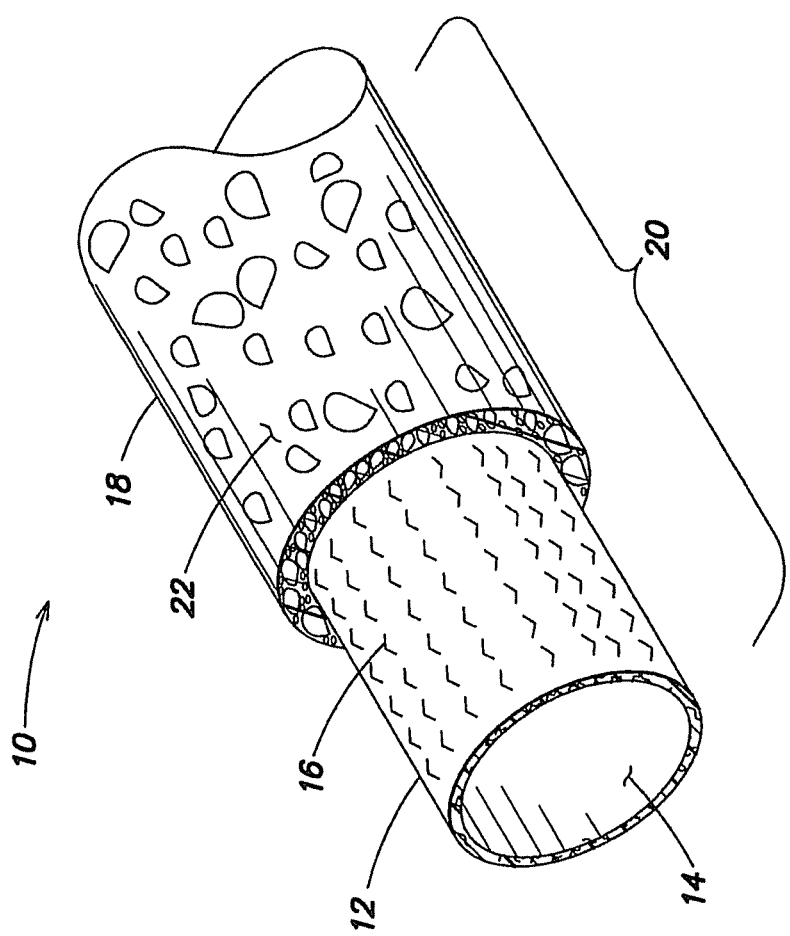
FIG. 1 is a perspective view, partially broken away, of a first embodiment of a bio-pharmaceutical hose of the present invention.

Referring to FIG. 1, there illustrated is a preferred embodiment of a hose 10 in accordance with the present invention. The hose 10 includes an inner tubular member or liner 12 that may comprise a commercially-available fluoropolymer material such as, for example, polytetrafluoroethylene ("PTFE"), fluorinated ethylene propylene ("FEP"), perfluoroalkoxy ("PFA"), ethelyne tetrafluoroethylene ("ETFE"), polyvinylidene fluoride ("PVDF"), or polychlorotrifluoroethylene ("PCTFE"). Alternatively, the inner liner 12 may comprise a plastic such as nylon, or another material such as a liquid crystal polymer. The inner tubular member 12, which itself may be commercially-available, may be formed by extrusion as a thin-walled "skin" with a preferred, exemplary thickness in the range of from 0.001 inches to 0.040 inches. The diameter of the resulting opening 14 in the member 12 (i.e., the "inner diameter") may range, for example, from 0.125 inches to 3.0 inches. As generally known to one of ordinary skill in the art, the size of the inner diameter of the opening 14 of the tubular member 12 determines the thickness of each layer in the hose 10, including that of the tubular member 12.

If desired, the fluoropolymer material comprising the tubular member 12 may be made electrically conductive by the addition of carbon in the form of, for example, finely divided carbon black particles or other graphite nanotube additives. Making the tubular member 12 electrically-conductive allows the member 12 to dissipate any undesired electrostatic charge that may tend to build up in the hose 10, particularly in the inner tubular member 12, by the media passing through the opening 14 in the inner tubular member 12. For use in bio-pharmaceutical applications, the fluoropolymer materials utilized for the member 12 are, in general, FDA-approved materials that also conform to the U.S. Pharmacopia ("USP") Class 6 purity standard. The inner tubular member or liner 12 thus forms a relatively pure, smooth, chemical- and temperature-resistant conduit and barrier for the medium which is conveyed therethrough. In particular, the fluoropolymer member 12 prevents the superheated steam used in the aforementioned steam cleaning process from permeating into the material comprising the inner tubular member 12 and causing degradation to such material.

An outer surface 16 of the inner tubular member 12 may be modified by exposure to various treatments and/or chemicals, including plasma discharge, corona discharge, or laser treatment, and/or sodium napthalate, ammonium napthalate, or ammonia. The resulting modified outer surface 16 has a relatively reduced amount of surface energy, which allows for better adhesion (i.e., reduced slippage) of the outer surface 16 to an inner surface of the next layer 18 that comprises the hose 10, discussed hereinbelow.

Disposed next to the outer surface 16 of the inner tubular member 12 as part of the hose 10 is a tubular layer 18 that comprises, in a preferred embodiment, a cross-linked silicone rubber material. To form the layer 18 next to or over the inner tubular layer 12, the silicone material may be wrapped around the outer surface 16 of the inner member 12, or may be over-molded to the outer surface 16 of the tubular member 12 by injection molding or cross-head extrusion methods. Preferably, the silicone material comprising the layer 18 is initially in liquid form and is cured to a solid state during the bonding process to the outer surface 16 of the tubular member 12. As a result, the silicone layer 18 forms a permanent bond to the inner tubular member 12.

More specifically, in a preferred embodiment of a method aspect of the invention using a cross-head extrusion technique, the silicone material comprising the layer 18 may initially include a liquid platinum or peroxide catalyzer and a separate liquid base silicone without the catalyzer but containing an adhesion promoter to promote adhesion to the outer surface 16 of the inner tubular member 12. The base silicone may be pigmented or clear. Both of these separate silicone elements are commercially available from, e.g., Specialty Silicones, Inc. of Ballston Spa, N.Y. The two separate silicone elements may be extruded onto the outer surface 16 of the inner tubular member 12 using a displacement pump system that includes two separate servo-controlled gear pumps for separately and simultaneously pumping and accurately metering the liquid silicone elements. The speed of the gear pumps is used to achieve relatively accurate metering of the silicone elements. The gear pumps typically pump the separate silicone elements from their containers through tubes or lines into a static mixing vessel or tube where the silicone elements are mixed together repeatedly to form a resulting liquid silicone mixture. In the mixing vessel it is generally not necessary to adjust the balance of the silicone elements. Preferably, the two separate silicone elements are mixed in a certain ratio, preferably a one-to-one ratio.

The silicone mixture then passes to a cross-head die where the mixture is extruded at room temperature around the outer surface 16 of the inner tubular member 12 in a particular profile (e.g., round or circular, as illustrated in FIG. 1). The cross-head die typically contains a negative (i.e., vacuum) pressure to remove any residual air. The inner tubular member 12 with the silicone mixture extruded thereon may then be passed to an infrared heating system that cross-links or cures the silicone to a hardened state. The resulting composite tube 20 comprising the inner tubular member 12 and the silicone layer 18 may then be quenched or cooled, thereby forming the composite tube 20 end product. During the extrusion process described above, the inner tubular member 12 may be pressurized throughout to prevent the member 12 from collapsing.

The thickness of the silicone layer 18 may be, for example, in the range of from 0.080 inches to 0.250 inches. However, the resulting thickness of the layer 18 depends on the desired inner diameter of the opening 14 in the tubular member 12, and, as such, the resulting layer thickness should be apparent to one of ordinary skill in the art in light of the teachings herein. After adhesion of the silicone layer 18 to the outer surface 16 of the tubular member 12 as described hereinabove, the composite tube 20 can be physically manipulated and kinked without causing any lasting defect.

As illustrated in FIG. 1, the layer 18 may comprise a foamed layer where the silicone material comprising the layer 18 may have air or some other gas (e.g., Argon/Nitrogen) introduced into it during the cross-head extrusion technique described hereinabove (or within some other technique for forming the silicone layer 18) to form a closed cell foamed or aerated construction of the layer 18, or may have a blowing or nucleating agent added to it as is known in the art to form voids in the silicone layer 18 when viewing an outer surface 22 of the silicone layer 18. Such a foamed construction gives the silicone layer 18 various known beneficial mechanical properties, including lighter weight and/or material savings. In the alternative, the layer 18 may be of solid silicone construction.

Advantageously, the bond between the inner tubular member 12 and the silicone layer 18 that form the composite tube 20 is generally strong enough to provide the inner tubular member 12 with a relatively large amount of kink resistance and flexibility, along with excellent recovery from crushing and kinking without any undesired separation of the member 12 and the layer 18. That is, the structural integrity of the composite tube 20 is maintained throughout typical usage of the hose 10 in various bio-pharmaceutical applications. In addition, the bond between the member 12 and the layer 18 can withstand the typical sterilization temperatures utilized in repetitive steam and/or autoclave procedures. Thus, the layer 18 provides the composite tube 20 with sufficient body and strength to be subsequently additionally reinforced, if desired, by braiding, as discussed hereinbelow. When flexed or bent into relatively tight bend radii, the silicone material comprising the layer 18 can stretch on the outside of the bend and compress on the inside. The silicone material may also provide an anchor for additional outer layers of the hose 10 to be adhered to, as discussed hereinbelow, with respect to alternative embodiments of the hose 10.

Figure 2:
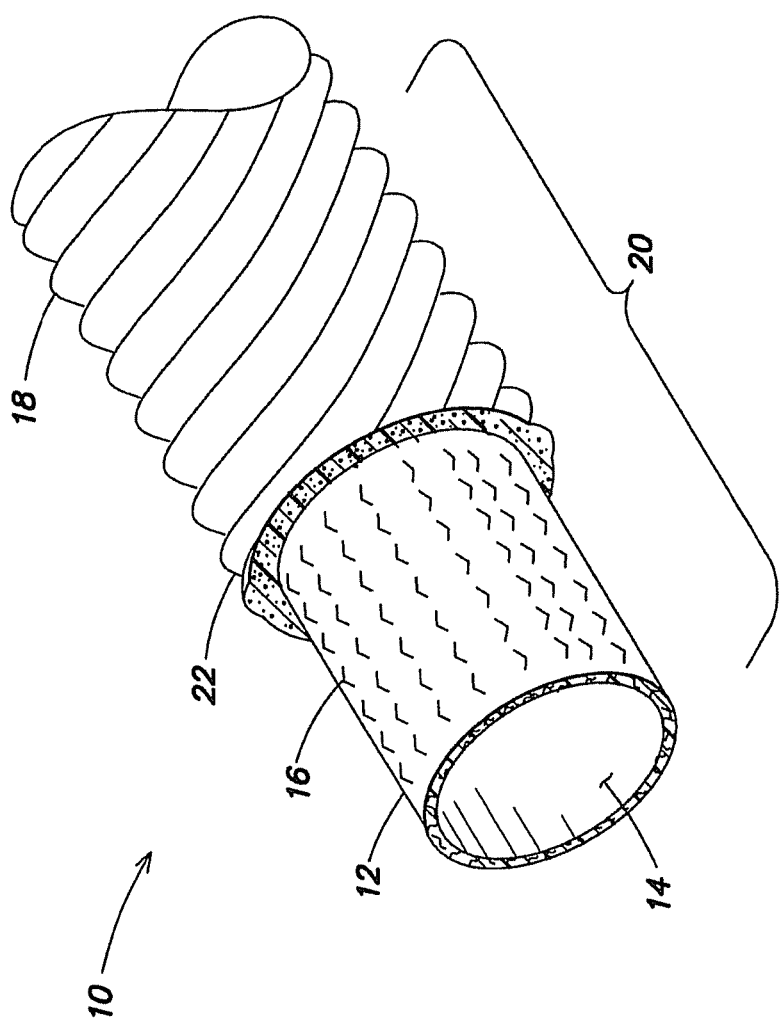
FIG. 2 is a perspective view, partially broken away, of an alternative embodiment of the hose of FIG. 1.

Referring to FIG. 2, an alternative embodiment of the hose 10 of FIG. 1 has the outer surface 22 of the inner silicone layer 18 of a corrugated or convoluted structure. For example, the outer surface 22 may have a single spiral groove formed therein, or multiple grooves formed in parallel therein. This provides the hose 10 with various beneficial features, including increased flexibility and resistance to kinking, and also relatively high tensile and hoop strength and ease of handling.

Figure 3:
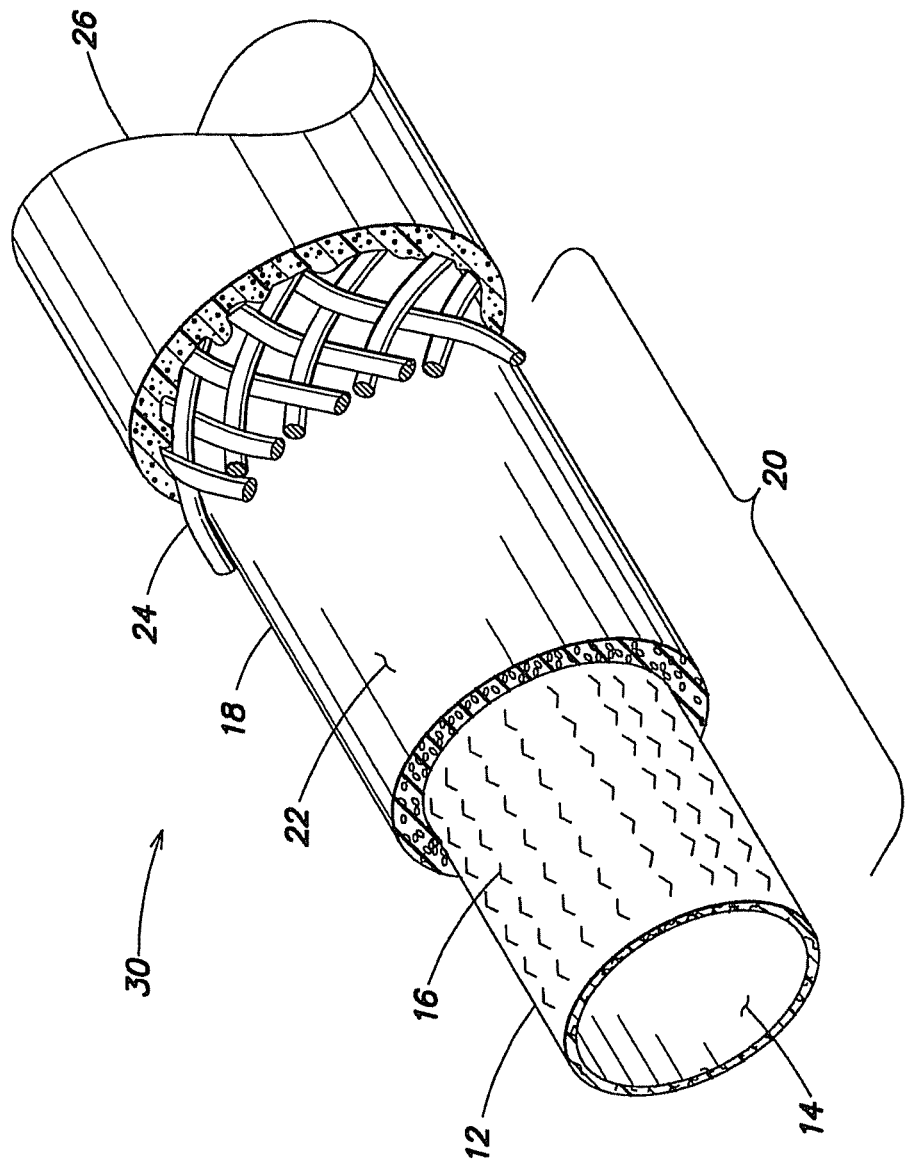
FIG. 3 is a perspective view, partially broken away, of an alternative embodiment of the hose of FIG. 1 having additional layers.

Referring to FIG. 3, an alternative embodiment of a hose 30 of the present invention includes the hose 10 (i.e., the composite tube 20) of FIG. 1 having a reinforcement layer 24 attached or disposed adjacent to the outer surface 22 of the inner silicone layer 18. The inner silicone layer 18 is illustrated in FIG. 3 as being of solid silicone construction, instead of the foamed construction of FIG. 1 or the convoluted outer surface 22 of FIG. 2. The reinforcement layer 24 may comprise a tubular wire braid construction and can be applied to the outer surface 22 of the silicone layer 18, for example, by known wrapping, knitting or braiding techniques. The reinforcement layer 24 may comprise a metal wire or a non-metallic (e.g., yarn) textile material such as cotton, polyester or aramid fiber. For example, using stainless steel wire with an open pitch provides relatively large gaps or interstices between the wires, as illustrated in FIG. 1. This allows an outer jacket 26 of the hose 30, discussed hereinbelow, which may initially comprise uncured liquid silicone during the extrusion process discussed herein, to penetrate through the gaps in the wire braid and abut the outer surface 22 of the inner layer 18. When cured, the silicone comprising the outer jacket 26 provides relatively excellent adhesion to the outer surface 22 of the inner silicone layer 18.

However, it is not required for the broadest scope of the present invention that the reinforcement layer 24 is provided with a wire braid with gaps or interstices between the wires to allow the outer jacket 26 to come in contact with the outer surface 22 of the inner silicone layer 18. The angle of the braid (preferably, 54 degrees) and the tension at which the wire is applied in the reinforcement layer 24 provides the hose 30 with relatively good kink resistance when bent or flexed. It also provides the hose 30 with excellent vacuum resistance (i.e., the resistance to collapsing of the tubular member 12 as well as the inner silicone layer 18 when negative pressure or suction is applied to the hose). Further, the tensile properties of the wire comprising the reinforcement layer 24 provides the hose 30 with the additional desired properties of flexural memory, suppleness and small bend radius capability. Also, the hoop strength and tensile strength of the hose 30 are increased through use of the reinforcement layer 24, which allows for the relatively simple and easy attachment of the hose 30 to various types of mechanical coupling devices.

As an alternative to the hose 30 comprising a separate reinforcement layer 24, the hose 30 may omit the reinforcement layer 24. The silicone layer 18 may instead contain relatively short fibers (e.g., aramid) to achieve the desired properties discussed above. The fibers may be introduced into the silicone material comprising the layer 18 during the formation of the silicone layer 18, as discussed hereinabove in the particular example of a cross-head extrusion process.

The outer jacket 26 of the hose 30 preferably comprises another layer of silicone that may be applied onto the reinforcement layer 24 as a wrapped layer, or may be injection molded or cross-head extruded, similar to cross-head extrusion process discussed hereinabove with respect to the formation of the inner silicone layer 18. The outer jacket 26 provides external serviceability for cleaning and protecting the inner layers 12, 18, 24 of the hose 30 from external damage. When extruded onto the reinforcement layer 24, the silicone (initially in liquid form) comprising the outer jacket 26 penetrates the interstices of the wire braid to form intimate contact with the outer surface 22 of the inner silicone layer 18. When cured, the liquid silicone material provides additional hoop strength to the composite tube 20 comprising the inner tubular member 12 and the inner silicone layer 18. Similar to the inner silicone layer 18, the silicone material comprising the outer jacket 26 may be of solid construction or may be foamed by the addition of gas or a blowing agent, resulting in a closed cell structure. Further, in general when the hose 30 includes the reinforcement layer 26, the outer surface of the outer jacket 26 preferably is of smooth construction, rather than being convoluted. In addition, a thermoplastic elastomer material may be utilized as the material of the outer jacket 26 instead of silicone. The thermoplastic elastomer material may have an adhesion system formulated into it.

Figure 4:
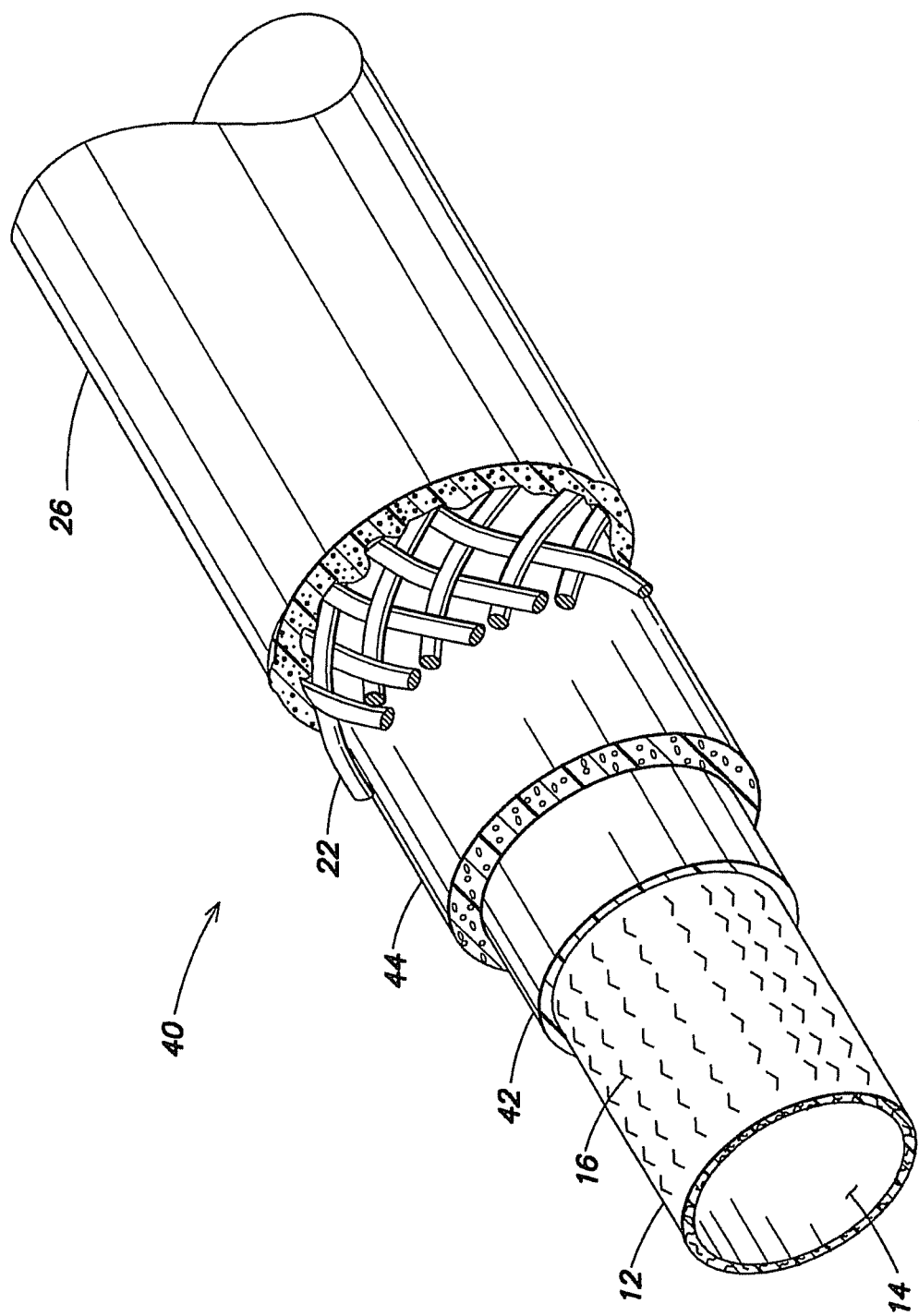
FIG. 4 is a perspective view, partially broken away, of an alternative embodiment of a bio-pharmaceutical hose of the present invention having optional layers.

Referring to FIG. 4, in an alternative embodiment of the present invention, a hose 40 includes the inner tubular member 12 of the hoses 10, 30 of FIGS. 1-3. In the hose 40, the inner layer 18 of silicone material is replaced by two separate layers 42, 44. A first layer 42 may comprise a relatively thin layer of modified polypropylene. The modifying or coupling agent may be a silane or a maleic-anhydride material. This material, which forms a permanent strong bond to the outer surface 16 of the inner tubular member 12, may be either injection molded or cross-head extruded over the outer surface 16 of the inner tubular member 12, using known techniques. The second layer 44 may be a thermoplastic elastomer from the olefinic family, or may be a urethane. This material can either be injection molded or cross-head extruded over an outer surface of the modified polypropylene layer 42, using known techniques. In general, thermoplastic elastomer materials are less expensive than silicone, do not need to be sterilized as often, and may require less processing steps (i.e., omission of the cross-linking step). Next the reinforcement layer 24 and the outer jacket 26 may be formed over the layer 44, similar to their methods of formation over the inner silicone layer 18 as described hereinabove with respect to the embodiment of the hose 30 illustrated in FIG. 3.

Figure 5:
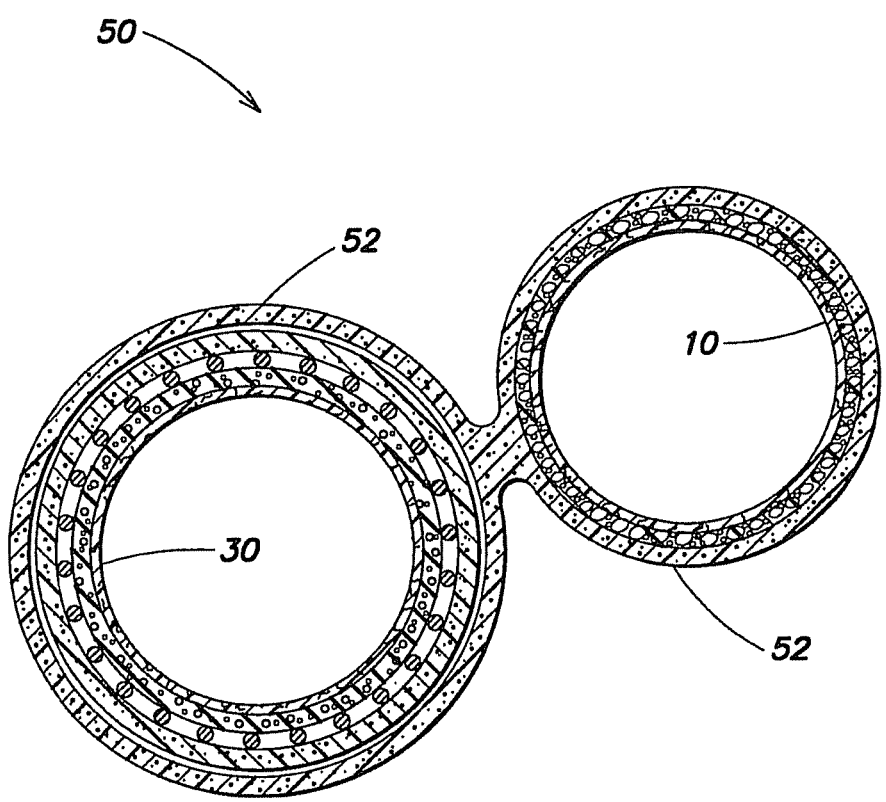
FIG. 5 is an end view of a plurality of the hoses of FIGS. 1 and 3 enclosed by an outer layer.

Referring to FIG. 5, there illustrated is an assembly 50 of a plurality hoses, specifically, hose 10 of FIG. 1 and the hose 30 of FIG. 3. However, the hose assembly 50 of FIG. 5 may comprise any combination of the aforementioned hoses 10, 30, 40. As illustrated in FIG. 3, the two hoses 10, 30 are disposed adjacent one another in a non-abutting physical relationship, and a single outer sleeve 52 is formed around the hoses 10, 30. The outer sleeve 52 may comprise a silicone rubber material, similar to that of the inner layer 18 and/or the outer jacket 26. The outer sleeve 52 may be formed using a similar cross-head extrusion technique described hereinabove with respect to the formation of the inner silicone layer 18, or by some other methods known to one or ordinary skill in the art.

With respect to the overall thickness of the hose 10, 30, 40 of the embodiments disclosed and illustrated herein, for an inner diameter of 1.0 inches, the resulting exemplary thickness of the entirety of the hose 10, 30, 40 is approximately 0.250 inches. However, it should be apparent to one of ordinary skill in the art that the thickness of the hose 10, 30, 40 can vary depending not only on the desired inner diameter of the opening 14 but on the number and thickness of the various layers utilized in the construction of the hose 10, 30, 40.

The hose 10, 30, 40 of the present invention has been described for use in bio-pharmaceutical applications. However, the hose is not limited as such. Instead, the hose 10, 30, 40 of the present invention may find use in various non-bio-pharmaceutical applications where is may be desired to utilize a hose having the physical characteristics and resulting benefits of that described herein.

Although the present invention has been illustrated and described with respect to several preferred embodiments thereof, various changes, omissions and additions to the form and detail thereof, may be made therein, without departing from the spirit and scope of the invention.

What is claimed is:

1. A hose comprising:
   an innermost tubular member that defines an opening therein and having an inner surface and an outer surface, where the inner surface is smooth throughout, and where the innermost tubular member comprises a fluoropolymer material;
   an inner layer of silicone adjacent to and bonded to the outer surface of the innermost tubular member, the inner layer of silicone having an outer surface;
   a wire braided reinforcement layer adjacent to the outer surface of the inner silicone layer, wherein gaps between wires of the reinforcement layer are larger than a diameter of said wires;
   an outer silicone jacket adjacent to the reinforcement layer, wherein the outer silicone jacket penetrates through said gaps between said wires of the reinforcement layer onto the outer surface of the inner silicone layer, wherein the outer silicone jacket is bonded to the outer surface of the inner silicone layer.

2. The hose of claim 1 wherein the outer silicone jacket is foamed using gas to form voids in the outer silicone jacket.

3. The hose of claim 1 wherein the innermost tubular member is a thin walled tubular member having a thickness between 0.001 inches and 0.040 inches.

4. The hose of claim 3 wherein the innermost tubular member is pressurized while the inner layer of silicone is formed on the outer surface of the thin walled tubular member.

5. The hose of claim 1 wherein the outer silicone jacket is applied by extrusion.

6. A hose comprising:
   an innermost tubular member that defines an opening therein and having an inner surface and an outer surface, wherein the innermost tubular member comprises a fluoropolymer material;
   an inner layer of silicone adjacent to and bonded to the outer surface of the innermost tubular member, the inner layer having an outer surface;
   a wire braid layer adjacent to the outer surface of the inner silicone layer, wherein the wire braid has interstices between wires of the wire braid, and wherein an area of one of said interstices is greater than a cross-sectional area of one of said wires;
   an outer silicone jacket adjacent to the wire braid layer, wherein the outer silicone jacket penetrates through said interstices of the wire braid onto the outer surface of the inner silicone layer to bond the outer silicone jacket to the outer surface of the inner silicone layer.

7. The hose of claim 6 wherein the outer silicone jacket is foamed using gas to form voids in the outer silicone jacket.

8. The hose of claim 6 wherein the innermost tubular member is a thin walled tubular member having a thickness between 0.001 inches and 0.040 inches.

9. The hose of claim 8 wherein the innermost tubular member is pressurized while the inner layer of silicone is formed on the outer surface of the thin walled tubular member.

10. The hose of claim 6 wherein the outer silicone jacket is applied by extrusion.

\* \* \* \* \*